United States Patent
Pyle et al.

(10) Patent No.: US 7,421,475 B2
(45) Date of Patent: Sep. 2, 2008

(54) METHOD AND SYSTEM FOR E-MAIL ALLOCATION

(75) Inventors: Robert Hamilton Pyle, Belton, TX (US); Gregory T. Schneider, Cedar Park, TX (US); Eric Joseph Campbell, Round Rock, TX (US); David Gandaria, Round Rock, TX (US); Nathan David Johns, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 1046 days.

(21) Appl. No.: 10/277,428

(22) Filed: Oct. 22, 2002

(65) Prior Publication Data

US 2004/0078438 A1    Apr. 22, 2004

(51) Int. Cl.
G06F 15/16    (2006.01)
(52) U.S. Cl. ..................................................... 709/206
(58) Field of Classification Search ................ 379/265; 705/11, 9; 710/52; 709/206
See application file for complete search history.

(56) References Cited

U.S. PATENT DOCUMENTS

| | | | | |
|---|---|---|---|---|
| 5,590,188 A | * | 12/1996 | Crockett | 379/265.02 |
| 6,356,633 B1 | * | 3/2002 | Armstrong | 379/265.11 |
| 6,449,646 B1 | * | 9/2002 | Sikora et al. | 709/226 |
| 6,563,920 B1 | * | 5/2003 | Flockhart et al. | 379/265.1 |
| 6,771,765 B1 | * | 8/2004 | Crowther et al. | 379/265.09 |
| 2002/0087648 A1 | * | 7/2002 | Petrovykh | 709/206 |

OTHER PUBLICATIONS

Using E-Mail Response Management to Improve Customer Service and Achieve Competitive Advantage. Cisco Systems. 2000. pp. 1-13.*
SetiQueue Which Queues. http://www.setiqueue.org/whichqueue.asp. Apr. 2002. pp. 1-3.*
Perimeter Technology—Optional Features http://www.ip-acd.com/products/VU-ACD100_opt.htm Accessed via WayBack Machine http://www.archive.org. May 2001.*
Perimeter Technology—Load Management http://www.ip-acd.com/products/VU-ACD100_lm.htm Accessed via WayBack Machine http://www.archive.org. May 2001.*
http://www.tiscali.co.uk/help/email/faq_forwarding.html Accessed via Wayback Machine http://www.archive.org. Aug. 2002.*
Alcatel, Alcatel Contact Center Agent, Jun. 2000, pp. 1-16.*

* cited by examiner

*Primary Examiner*—Andrew Caldwell
*Assistant Examiner*—Grant Ford
(74) *Attorney, Agent, or Firm*—Hamilton & Terrile, LLP; Robert W. Holland

(57) ABSTRACT

Customer e-mail service requests are allocated to plural working groups for response through virtual queues that store unanswered e-mail and meter the unanswered e-mail to working queues that make the e-mails available to associated working groups. The working queues are replenished from the virtual queues to maintain above a minimum and up to a maximum number of e-mails. The virtual queues are manipulated to control e-mail flow rates by allocating e-mails to virtual queues based on desired factors and by moving e-mail between virtual queues as needed to manage working groups. The virtual queues allow tracking of e-mail response metrics and monitoring of working group performance and timeliness.

20 Claims, 3 Drawing Sheets

METHOD AND SYSTEM FOR E-MAIL ALLOCATION

BACKGROUND OF THE INVENTION

1. Field of the Invention

The present invention relates in general to the field of electronic communications, and more particularly relates to a method and system for allocation of e-mail communications.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One difficulty with the use of a wide variety of available information handling systems is that customers who purchase and use information handling systems typically run into a wide variety of service and support problems and have a variety of service and support questions and requests for information about purchased information handling systems. One common way for customers to seek solutions to these service and support questions is to contact the manufacturer of the information handling system by phone. However, responding to phone inquiries is expensive and labor intensive for manufacturers. For example, service and support for responding to phone inquiries generally must be highly trained in order to promptly and correctly address customer inquiries. If customers request information beyond the expertise of service and support, the customer generally must wait on hold while the support personnel research the issue. The equipment and communication lines for such a process are expensive, especially if the service and support is located overseas. Further, service and support personnel must often cope with frustrated customers. Thus, manufacturers tend to be cautious in outsourcing telephone service and support to third parties, especially where the outsourced support speaks limited English.

One attractive alternative to telephone support is the use of e-mail support to respond to customer inquiries, whether the inquiries relate to information handling systems or other products or services. Responding to e-mail inquiries tends to require less expensive equipment than does responding to telephone inquiries and provides service and support with more time and less pressure in arriving at an effective response. Further, e-mail support may be provided by anonymous personnel so that language and diction barriers are reduced. Thus, e-mail inquiries are more easily outsourced for response by third parties, including by overseas personnel who speak English as a second language. However, tracking large quantities of e-mails to ensure proper and timely handling of customer service inquiries presents a substantial logistical problem. E-mail servers send e-mails to queues for response based on an e-mail address but provide limited access and flexibility for the preparation of responses once e-mails are assigned to queues. Thus, for instance, an information handling system manufacturer that outsources customer e-mail service requests will tend to have difficulty in tracking the working group that is assigned to respond, the service level of the response, the quality of the response and the cost of the outsourced service and support. This difficulty increases when working groups may be physically located anywhere in the world.

SUMMARY OF THE INVENTION

Therefore a need has arisen for a system and method which allocates and measures customer e-mail service requests for response among plural working groups.

A further need exists for a system and method which improves the ability for a business to outsource customer e-mail service requests to remote service and support.

In accordance with the present invention, a system and method are provided which reduce the problems and difficulties associated with previous systems and methods for allocating, measuring and responding to customer e-mail service requests. Customer e-mail service requests are allocated to "virtual queues" that are maintained separate from an associated e-mail management system, and then the e-mail service requests are transferred to the working queues so that the working queues maintain a predetermined quantity of e-mails. The virtual queues thus manage work flow for e-mail response preparation by working groups associated with the working queues.

More specifically, an allocation engine accepts customer e-mail service requests and allocates e-mail to virtual queues based on one or more predetermined factors. Each virtual queue is associated with one or more working queues and is operable to store e-mail until the e-mail is transferred to a working queue. The allocation engine meters e-mail flow to the working queues to maintain a predetermined number of e-mails in the working queues. Working groups access the working queues to prepare responses to customer e-mail service requests. Working group service levels are monitored by tracking virtual queue size and aging, and the flow of e-mails to working groups is adjusted by altering the amount of e-mails transferred to the working queue associated with the working group. Allocated e-mails are re-allocated by shifting e-mails between virtual queues. This advantageously provides improved flow control, improved measurement of volume and performance, and significant cost reductions.

The present invention provides a number of important technical advantages. One example of an important technical advantage is that customer e-mail service requests are efficiently and flexibly allocated among plural working groups. The virtual queues manage work flow for responding to e-mails by metering e-mails to working groups through working queues. This provides control over allocation of e-mails to different working groups, such as with a percentage allocation or maximum number of e-mails to a working group. Flow control is provided by setting desired working queue depth, time control is provided by setting service levels and tracking queue aging, and automated level control is provided by altering working queue depth over time, such as reducing working queue depth as a working group closes operations.

Another example of an important technical advantage is that the present invention controls and monitors the preparation of responses to customer e-mail service requests to provide improved cost and quality control for outsourced working groups that respond to e-mails. By defining working queue depth to have a generally small size that does not become depleted, a substantial number of pending e-mails are maintained in virtual queues to allow more accurate quality control of outsourced service and support. The number and age of e-mails stored in a virtual queue indicates the service level provided by working groups associated with the virtual queue. If a working group service level drops below an acceptable degree, e-mails are reallocated by moving them within the virtual queues, thus avoiding any interference with the e-mail management system's working queues.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Businesses are able to respond to e-mail service requests with greater efficiency and accuracy in the form of measurement, scalability and cost per contact than other types of service requests, such as phone calls. For instance, manufacturers of information handling systems are often able to more accurately and completely address complex customer service issues with e-mail responses. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
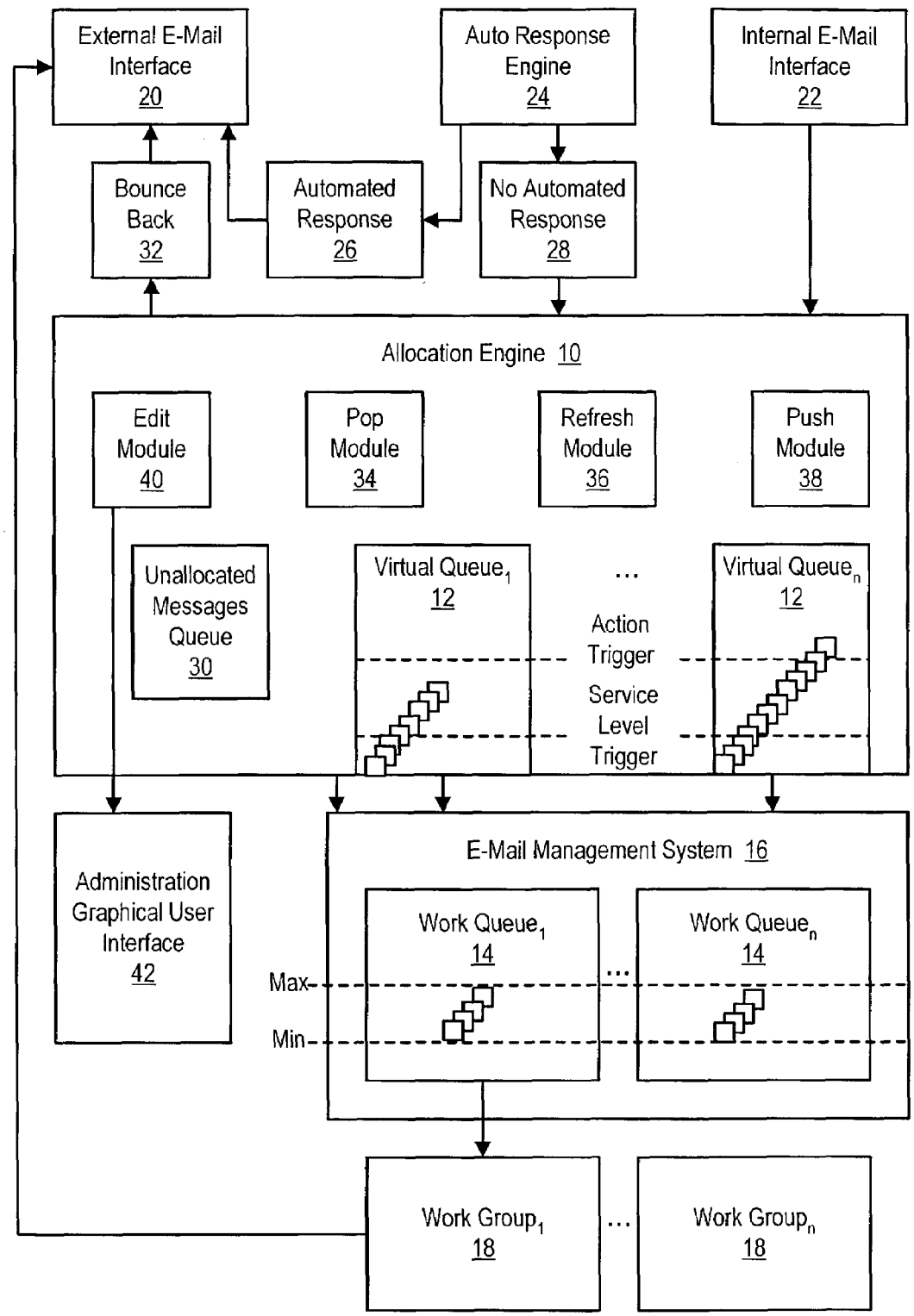
FIG. 1 depicts a block diagram of a system for allocation of e-mail to plural working groups.

Referring now to FIG. 1, a block diagram depicts a system for responding to customer e-mail service requests. An allocation engine 10 allocates the customer e-mail service requests to appropriate work groups in an efficient and cost effective manner by using virtual queues to control e-mail flow to work queues 14 of an e-mail management system 16. Manageable numbers of e-mail service requests are maintained in work queues 14 to ensure that work groups 18 associated with each work queue 14 have a steady stream of e-mails for which to prepare responses. The flow of e-mails is managed through virtual queues 12 to allow more rapid and accurate allocations.

E-mail service requests are accepted through either an external e-mail interface 20 or an internal e-mail interface 22. For instance, a manufacturer of information handling systems accepts e-mail requests for service from customers who have purchased information handling systems, such as customer requests for warranty or operating tips, through external e-mail interface 20, and accepts employee requests for service for internal systems through internal e-mail interface 22. External e-mail interface 20 forwards inbound e-mail requests to an auto response engine 24. Auto response engine 24 is an artificial intelligence analyzer that sends an automated response 26 if indicated as appropriate based on an analysis of the substance of the inbound e-mail and otherwise sends no automated response 28 and forwards the e-mail to allocation engine 10.

Allocation engine 10 manages the flow of all support e-mail received through external e-mail interface 20 and internal e-mail interface 22. Initially allocation engine 10 determines if incoming e-mail is subject to allocation with a POP module 36. Unallocated messages are sent to an unallocated message queue 30 to forward to e-mail management system 16 and acknowledgements of receipt of the customer's message, referred to as bounce backs, are generated by a bounce back module 32 and e-mailed to the sender. A message is identified as unallocated if, for instance, it is sent to a single working group or otherwise has a predetermined destination that does not call for allocation. Allocated messages are stored in virtual queues 12, with each virtual queue 12 mirroring a working queue 14 of e-mail management system 16. Virtual queues 12 serve as holding areas for the working queues and e-mail is metered from the virtual queues 12 to associated working queues 14 on a demand basis by a push module 38 as the working queues are depleted by associated work groups 18. A refresh module 36 monitors the status of virtual and work queues to track minimum and maximum storage levels and to track service and alarm trigger levels in the virtual queues. An edit module 40 allows an administrator to set parameters of virtual and working queues through an administration graphical user interface 42.

The metering of service e-mail by using virtual queues 12 as holding areas for working queues 14 provides improved flexibility in the management of preparation of responses to the service e-mails. For instance, a steady and controllable flow of service e-mails passes into each working queue with the size of the working queue maintained at a desired quantity of stored e-mails. Thus, support agents of a working group draw service e-mails from a working queue and prepare responses. As a working queue draws below a minimum number of service e-mails, the working queue is replenished from its associated virtual queue. As a working queue closes the virtual queue re-directs service e-mail to other working queues to allow the closing working queue to be emptied, preventing e-mail from sitting in the closed queue and adversely impacting service level. Since the majority of unanswered service e-mail remains in virtual queues, reallocation is accomplished with relative ease and without impacting the operation of e-mail management system 16. Further, changes in the allocation between virtual queues creates an audit trail that allows accurate computation of service level by working queues and associated working groups.

Figure 2:
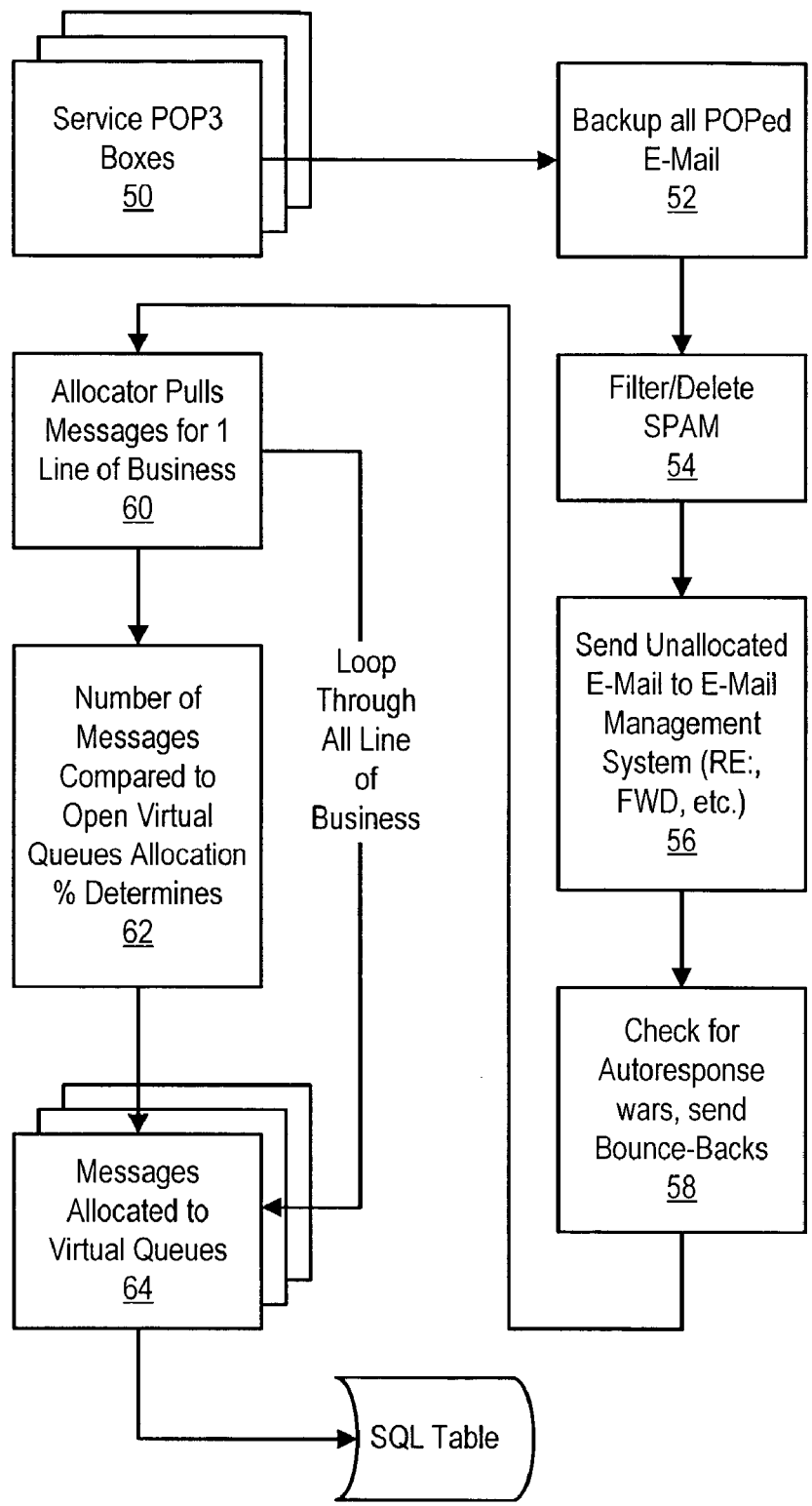
FIG. 2 depicts a flow diagram of functions performed by the POP module.

Referring now to FIG. 2, a flow diagram depicts the process of POP module 34 for accepting and allocating inbound service e-mails. At step 50, a POP e-mail retrieval is made for POP3 boxes associated with service addresses. At step 52, the retrieved e-mail is backed-up to maintain a historical copy of all retrieved e-mail. At step 54, the retrieved e-mail is filtered to eliminate irrelevant messages, such as SPAM or mass marketing messages, advertising and pornography or obscene messages. At step 56, unallocated e-mails are sent directly to the e-mail management system. POP module identifies unallocated e-mail based on the addressee or based on other information, such as a reply or forward identifier that indicates that the e-mail is not an initial contact with the customer.

At step 58, POP module 34 checks for repetitive e-mails, such as multiple auto response messages and bounce back acknowledgments. Multiple bounce back messages may be generated in some instances where a bounce back acknowledgement is sent to a customer e-mail to let the customer know that the customer's service request was received and is in process for a response. For instance, when allocation engine 10 assigns a service e-mail to a virtual queue, it may optionally send a bounce back e-mail to the customer to inform the customer of when to expect a response based on the expected response time associated with the queue to which the service e-mail is assigned. However, if the bounce back message to the customer is met by the customer's own auto response message, such as an out-of-office-reply, an endless loop of messages may result. To prevent such a loop, at step 58 POP module 34 monitors inbound message alias and message subjects and applies detected repetition of a message/sender pair to automatically suppress the sending of any further auto responses.

At step 60, POP module 34 sorts the retrieved e-mails by line-of-business designation. For instance, each line of business that accepts e-mail service requests uses a distinct alias to which service e-mail is addressed. As a more specific example, a manufacturer of different types of information handling systems pre-configures the information handling system to send service e-mails to defined alias addresses based on the type of system. Alternatively, links of a web site initiate e-mail service responses to specific alias based on the information displayed by the web site. Each alias is used to sort retrieved e-mails by line of business and each line of business is processed in turn. At step 62, the number of messages in the sorted line of business is compared with an open virtual queue allocation percentage. For instance, service e-mails associated with a given line of business are assigned to predetermined virtual queues with a defined percentage allocated to each open virtual queue. The percentage allocation is set through edit module 40 and may change as working queues open and close or if reset to adjust for working queue response time. Further, opening and closing times for working queues are used to prevent allocation of service e-mails during time periods that the queue is closed. At step 64, the retrieved service e-mails are allocated to virtual queues and the process returns to step 60 until all retrieved e-mails are allocated. Allocated e-mails are stored in an SQL database by virtual queue until sent to an associated working queue.

Figure 3:
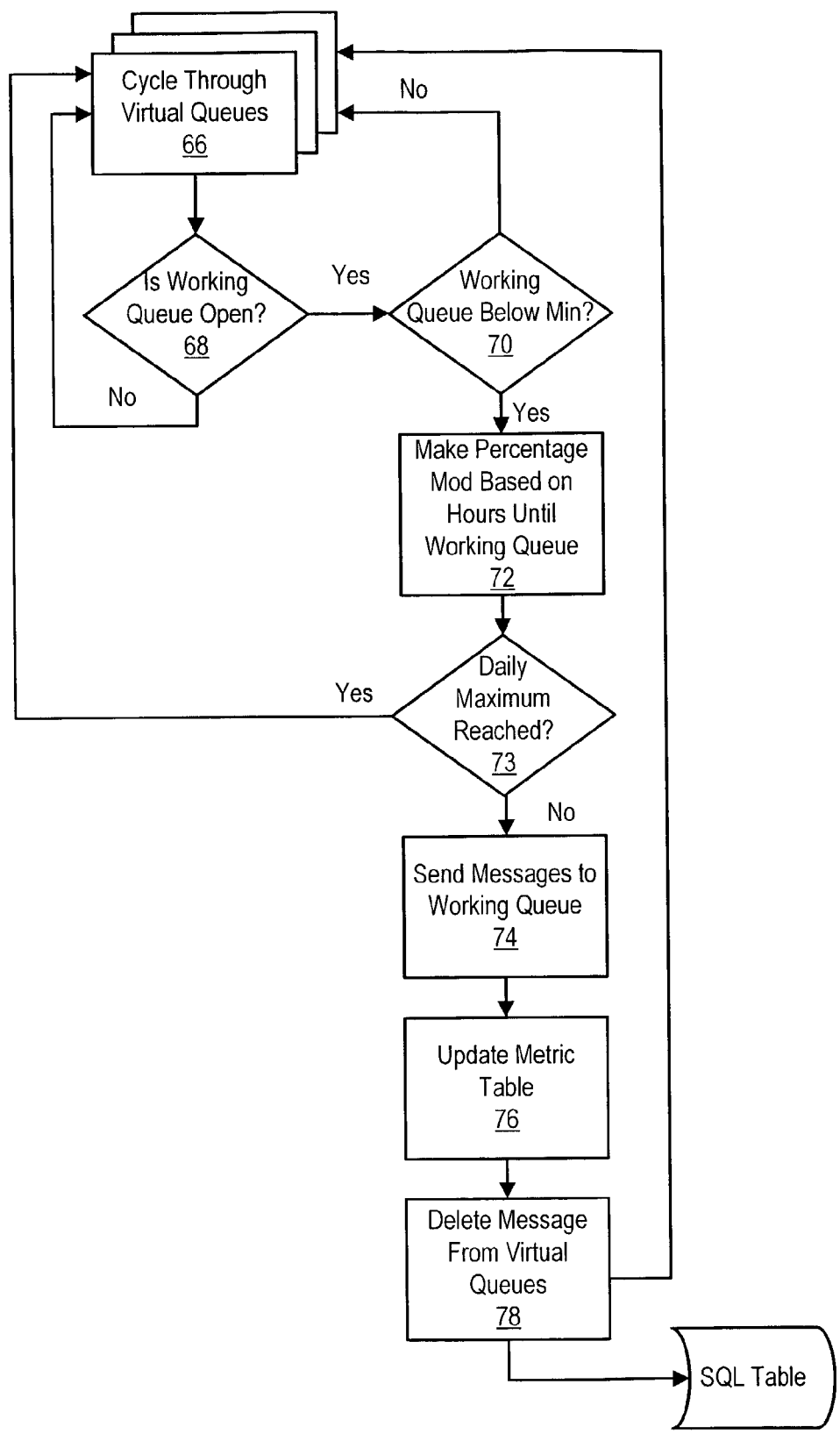
FIG. 3 depicts a flow diagram of functions performed by the push module.

Referring now to FIG. 3, a flow diagram depicts the process used by push module 38 to maintain working queues at desired levels of service e-mails for response by associated working groups. At step 66, the process begins with periodic or continuous cycling through each virtual queue in sequence by the selection of the next virtual queue in sequence. At step 68 a determination is made of whether the working queue that is associated with the selected virtual queue is open to accept e-mails for response. If not, the process returns to step 66 to process the next virtual queue in sequence. If the working queue is open, the process proceeds to step 70 to determine if the working queue is below a predetermined minimum number of e-mails. The number of e-mails in each working queue is periodically polled by refresh module 36. If at step 70 the number of e-mails is above the minimum, additional e-mails are not sent and the process returns to step 66.

If at step 70 the number of e-mails in the associated working queue is below the predetermined minimum number, the process proceeds to step 72 to determine if a modification is made to the minimum number based on the time until closing of the working queue. For instance, a regression process reduces the flow of e-mails to a working queue at the end of a working day to insure that the working queue is empty at close time. In one embodiment, the minimum and maximum number of e-mails in the working queue is reduced an hour before close time by a set percentage and again one half hour before closing time to reduce the flow of e-mails for response so that the agents of the work group are able to empty the working queue by closing time. At step 73, a check is done to determine if a defined maximum number of discrete e-mails has been sent in a time period, such as a 24 hour period. If yes, the process returns to step 66 without sending messages to the working queue since the working group has reached its maximum allocation. At step 74, a number of e-mails is sent to the working queue to increase the number of e-mails in the working queue to the maximum number minus any modifications determined at step 72. At step 76, the SQL table metric is updated to reflect the additional e-mails sent and at step 78 the sent e-mails are deleted from the virtual queue. The process then returns to step 66 to continue with an evaluation of the next virtual queue in sequence.

As service work groups respond to service e-mails, administration graphical user interface 42 allows tracking and adjustments to virtual queues 12 to monitor service e-mail response rates. For instance, the number of e-mails in the virtual queues is monitored and alerts are available for different service levels. If the number of e-mails drops below the minimum number for a virtual queue, an alert allows an administrator to adjust queue depth by moving e-mails to the low virtual queue from other virtual queues. If the number of e-mails increases above a maximum number, an alert allows an administrator to shift the extra e-mails to a different virtual queue to avoid response delays. Service and trigger level monitoring provides alarms based on time in queue for the longest stored e-mail in a virtual queue. If the time in queue exceeds a desired service level, a service alarm alerts an administrator to the delays is service. If the time in queue exceeds a trigger level, performance penalties are applied against the working group for failing to meet service time requirements.

Although the present invention has been described in detail, it should be understood that various changes, substitutions and alterations can be made hereto without departing from the spirit and scope of the invention as defined by the appended claims.

What is claimed is:

1. A system for allocating customer e-mail service requests made to a business, the system executable by an information handling system, the allocation between plural working groups for responding to the customer service requests, the system comprising:

an e-mail interface operable to accept customer e-mail service requests;

an allocation engine interfaced with the e-mail interface and having plural virtual queues, each virtual queue operable to store customer e-mail service requests associated with a working group, the allocation engine operable to allocate customer e-mail service requests to virtual queues based on one or more predetermined factors; and an e-mail management system interfaced with the allocation engine and having plural working queues, each working queue operable to store customer e-mail service requests associated with a working group, the e-mail management system operable to accept e-mails from a virtual queue of the allocation engine in an associated working queue for handling by an associated working group;

wherein the allocation engine transfers e-mails from virtual queues to working queues to maintain a quantity of e-mails in the working queues at a predetermined amount.

2. The system of claim 1 wherein a working queue remains open for a predetermined time and wherein a quantity of e-mails in the working queue comprises an amount that approximates the number of e-mails that the associated working group can handle in the predetermined time.

3. The system of claim 1 wherein a predetermined factor that the allocation engine allocates customer e-mail service requests to virtual queues comprises a predetermined percent of customer e-mail service requests received at the e-mail interface.

4. The system of claim 1 wherein a predetermined factor that the allocation engine allocates customer e-mail service requests to virtual queues comprises a predetermined maximum number of customer e-mail service requests for a predetermined virtual queue.

5. The system of claim 1 wherein the allocation engine is further operable to provide an alert if a number of e-mail service requests in a virtual queue exceeds a predetermined number.

6. The system of claim 1 wherein the allocation engine is further operable to identify a working group for a penalty if a virtual queue associated with the working group exceeds a predetermined number of e-mail service requests.

7. The system of claim 1 wherein the e-mail service requests comprise requests for service associated with an information handling system.

8. The system of claim 2 wherein the allocation engine is further operable to decrease the amount of e-mails allocated to the working queue as the time decreases that the working queue will remain open.

9. The system of claim 2 wherein the allocation engine transfers e-mails in the working queues associated virtual queue to another virtual queue once the working queue closes.

10. A method for allocating customer e-mail service requests made to a business for response by plural working groups, the method comprising:

retrieving e-mail service requests sent by customers to the business;

allocating each e-mail service request to one of plural virtual queues;

providing e-mail service requests to the plural workings groups, each working group obtaining e-mail service requests for a working queue associated with the working group; and monitoring a quantity of e-mail service requests in each working queue to maintain at least a minimum number by replenishing a working queue with e-mail service requests from an associated virtual queue if the number of e-mail service requests in the working queue falls below the minimum number.

11. The method of claim 10 further comprising:

defining a maximum number of e-mail service requests to place in a working queue; and replenishing a working queue with e-mail service requests when a size of the queue falls below the minimum by transferring e-mail service requests from the associated virtual queue to bring the working queue to the maximum number of e-mail service requests.

12. The method of claim 10 wherein allocating further comprises:

analyzing addresses of e-mail service requests to identify lines of business; and allocating the e-mail service requests to virtual queues by the line of business associated with the e-mail service requests.

13. The method of claim 10 wherein allocating further comprises assigning predetermined percentages of e-mail service requests to the virtual queues.

14. The method of claim 10 wherein allocating further comprises assigning no more than a predetermined number of e-mail service requests to a predetermined virtual queue.

15. The method of claim 10 further comprising:

monitoring a quantity of e-mail service requests in the virtual queues;

detecting that a first virtual queue has a predetermined number of e-mail service requests; and re-allocating e-mail service requests from a first virtual queue to a second virtual queue to reduce the number in the first virtual queue.

16. The method of claim 10 further comprising:

monitoring a wait time that an oldest e-mail service request has been stored in a virtual queue; and setting an alert if the wait time exceeds a predetermined time period.

17. The method of claim 10 further comprising sending a bounce back acknowledgement to an e-mail service request to inform the sender of a pending response.

18. The method of claim 11 further comprising:

determining that a selected working queue will close in a predetermined amount of time; and decreasing the minimum and maximum number of e-mail service requests for the selected working queue.

19. The method of claim 17 further comprising:

monitoring e-mail service requests to determine if a sender has responded to an auto response; and preventing the sending of an auto response to sender responses to previously-sent auto responses.

20. The method of claim 18 further comprising:

determining that the working queue is closed; and preventing subsequent transfer of e-mail service requests from the virtual queues to the closed working queue.

* * * * *